US011117686B2

(12) United States Patent
Wichowski et al.

(10) Patent No.: US 11,117,686 B2
(45) Date of Patent: Sep. 14, 2021

(54) SHARED RESISTIVE SENSOR MEASUREMENT WITH FPGA BASED COLLISION AVOIDANCE PROTECTION

(71) Applicant: Hamilton Sundstrand Corporation, Charlotte, NC (US)

(72) Inventors: Robert P. Wichowski, Westfield, MA (US); Patrick J. Sears, South Hadley, MA (US); Timothy A. Roberts, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 226 days.

(21) Appl. No.: 16/365,261

(22) Filed: Mar. 26, 2019

(65) Prior Publication Data

US 2020/0307832 A1    Oct. 1, 2020

(51) Int. Cl.
*B64G 1/36* (2006.01)
*G05D 1/10* (2006.01)
*G05D 1/00* (2006.01)

(52) U.S. Cl.
CPC ............. *B64G 1/36* (2013.01); *G05D 1/0077* (2013.01); *G05D 1/10* (2013.01)

(58) Field of Classification Search
CPC .......... B64G 1/36; G05D 1/0077; G05D 1/10; G08C 13/00; H04Q 9/04
See application file for complete search history.

(56) References Cited

U.S. PATENT DOCUMENTS

| | | | |
|---|---|---|---|
| 8,406,217 B2 | 3/2013 | Zakrzewski | |
| 10,184,804 B1 | 1/2019 | Willett et al. | |
| 2014/0365702 A1 | 12/2014 | Ray et al. | |
| 2015/0331776 A1* | 11/2015 | Krenik | G06F 13/4022 710/110 |
| 2018/0198545 A1 | 7/2018 | Aichriedler et al. | |
| 2019/0069051 A1* | 2/2019 | Al-Stouhi | H04Q 9/04 |

FOREIGN PATENT DOCUMENTS

WO    2016057289 A1    4/2016

OTHER PUBLICATIONS

Krieger et al., "TanDEM-X: A Satellite Formation for High-Resolution SAR Interferometry", 2007, IEEE (Year: 2007).*
Extended European Search Report for International Application No. 19211137.5 dated Jul. 23, 2020, 8 pages.

* cited by examiner

*Primary Examiner* — Peter D Nolan
*Assistant Examiner* — Ashley L Redhead, Jr.
(74) *Attorney, Agent, or Firm* — Cantor Colburn LLP

(57) ABSTRACT

Providing collision avoidance protection to controllers sharing the same sensor. Each of a pair of asynchronous controllers changes the period of a sync pulse transmitted to the other controller to indicate to the other controller it is synchronized. When one of the controllers begins reading data from the shared sensor, the other controller waits to receive another sync pulse for indicating when the controller is finished reading data from the shared sensor. Thus, the asynchronous controllers avoid accessing the same sensor at the same time.

17 Claims, 6 Drawing Sheets

SHARED RESISTIVE SENSOR MEASUREMENT WITH FPGA BASED COLLISION AVOIDANCE PROTECTION

BACKGROUND

The invention relates generally to controllers and sensors, and more particularly, to providing collision avoidance when multiple controllers share the same sensor.

Vehicles such as aircraft and spacecraft are limited in the available space they have for internal systems such as, for example, life support and environmental systems. Thus, because space is limited, the number of sensors available for controllers within the internal systems is limited. Within each internal system there typically is a pair of sensors corresponding with each controller for redundancy. However, with today's designs, there is not enough room to accommodate a pair of sensors for each of the controllers. If a pair of controllers share the same sensor, then the data from the shared sensor would be corrupted if both controllers accessed the shared sensor simultaneously. What is needed is the ability for two independent controllers to share the same sensor without corrupting the sensor's data.

SUMMARY

According to a non-limiting embodiment, a method for providing collision avoidance protection to controllers sharing the same sensor is provided. The method includes sending a first sync pulse via a primary controller to a secondary controller and sending a second sync pulse via the secondary controller to the primary controller. In response to receiving the second sync pulse at the primary controller, the primary controller changes a period of the first sync pulse to the secondary controller to indicate to the secondary controller that the primary controller is synced to the secondary controller. Also, in response to receiving the first sync pulse at the secondary controller, the secondary controller changes a period of the second sync pulse to the primary controller to indicate to the primary controller that the secondary controller is synced to the primary controller. The method further includes reading, via the primary controller, data from a shared sensor while the secondary controller waits for another sync pulse from the primary controller, wherein the other sync pulse indicates that the primary controller is no longer reading data from the shared sensor. The method also includes, in response to the secondary controller receiving the other sync pulse from the primary controller indicating the primary controller is no longer reading data from the shared sensor, reading, via the secondary controller, data from the shared sensor and the primary controller waiting for another sync pulse from the secondary controller, wherein the other sync pulse from the secondary controller indicates the secondary controller is no longer reading data from the shared sensor.

According to another non-limiting embodiment, a system for providing collision avoidance protection to controllers sharing the same sensor is provided. The system includes a first field programmable gate array (FPGA) that includes a primary controller and a second FPGA that includes a secondary controller, wherein the primary and secondary controllers are asynchronous relative to one another, and wherein the primary and secondary controllers synchronize communications for receiving sensor data. The system also includes a pair of shared sensors, wherein each of the sensors of the pair of sensors is shared between the primary and secondary controllers, one of the sensors of the pair of sensors is dedicated to the primary controller, and the other sensor of the pair of sensors is dedicated to the secondary controller. Also, the system includes wherein, in response to receiving a first sync pulse from the primary controller at the secondary controller, the secondary controller changes a period of a second sync pulse sent to the primary controller to indicate to the primary controller that the secondary controller is synced to the primary controller, and in response to receiving the second sync pulse from the secondary controller at the primary controller, the primary controller changes a period of the first sync pulse to the secondary controller to indicate to the secondary controller that the primary controller is synced to the secondary controller.

According to yet another non-limiting embodiment an asynchronous controller for synchronizing reading of data from a shared sensor across a shared communication channel is provided. The controller is configured from an FPGA and reads data from the shared sensor. The controller changes a period of a sync pulse to indicate when the controller is finished reading data from the shared sensor across the shared communication channel. The controller then waits to receive a sync pulse with a changed period in order to commence reading data again from the shared sensor.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

Figure 1:
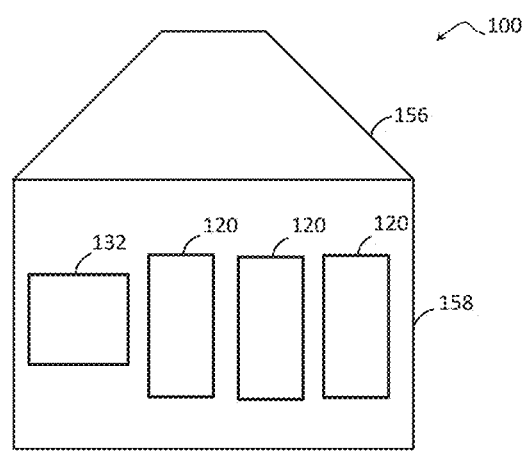
FIG. 1 depicts an exemplary embodiment of a spacecraft having a system control and a plurality of interior systems for a space environment according to one or more embodiments of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. Accordingly, in the interest of brevity, many conventional implementation details are only mentioned briefly herein or are omitted entirely without providing the well-known system and/or process details.

Referring to FIG. 1, there is shown an embodiment illustrating a vehicle which may be any type of vehicle such as, for example, aircraft, spacecraft, space station, satellite, land vehicle and marine vehicle used while implementing the teachings herein. For explanation purposes, the vehicle is hereinafter simply referred to as a spacecraft 100. However, the teachings herein are not to be limited to only spacecraft.

In one or more embodiments, the spacecraft 100 is configured from multiple preconstructed assemblies such as assemblies 156, 158 shown in FIG. 1. Although the spacecraft 100 is depicted as having only the two assemblies 156, 158, any number of assemblies may be utilized to configure a vehicle such as the spacecraft 100. Each of the assemblies is manufactured to include one or more interior systems. For example, in FIG. 1 the assembly 158 includes interior systems 120. However, each assembly may have any number of interior systems 120. An interior system 120 can be, for example, a life support system, air revitalization system, pressure control system, and the like. Each system may include, for example, various subsystems depending on the intended function such as controllers, processors, fans, actuators, valves, regulators, motors, generators, heat exchangers, carbon dioxide removal systems, trace contaminant control, smoke detectors and the like. Depending on the type of vehicle, such as a spacecraft or space station, the interior systems and subsystems may be hardened against radiation so that they may function and survive within a radiation environment.

Figure 3:
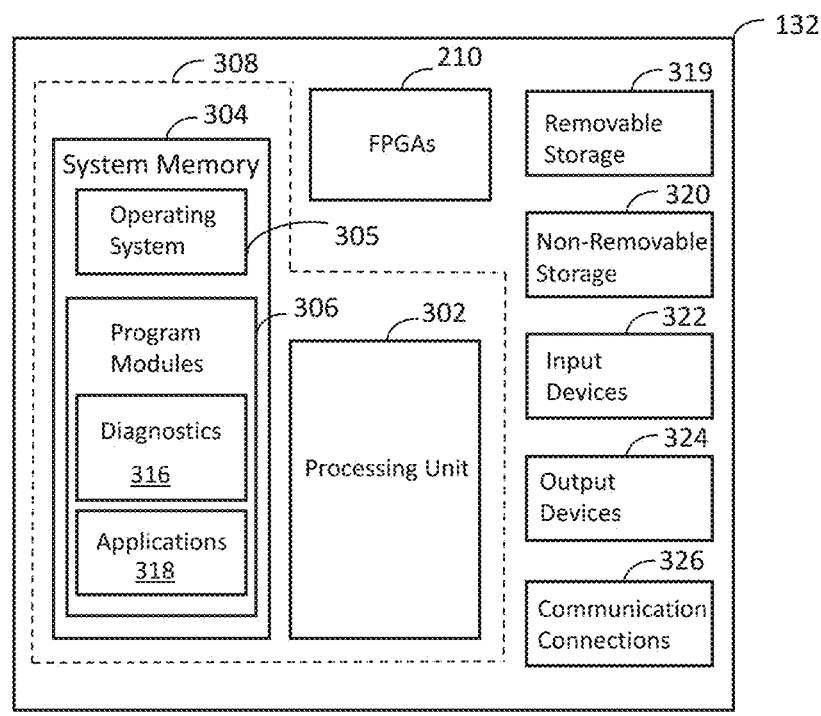
FIG. 3 depicts a block diagram illustrating an exemplary control system that may be utilized to implement one or more embodiments of the present invention.

Still referring to FIG. 1, the spacecraft 100 includes a system control 132 for monitoring and managing the operation and behavior of the spacecraft 100 as well as the interior systems 120. In particular, the system control 132 receives telemetry data from the spacecraft 100 which it uses to monitor the spacecraft's health. The telemetry data contains sampled data to provide information about its internal systems 120. The system control 132 is a computerized system similar to a general-purpose computing system that is radiation hardened and that is allocated with mission and internal system requirements which define the system control's operational modes and states. FIG. 3 illustrates an exemplary embodiment of the physical components (i.e., hardware) of the control system 132.

Figure 2:
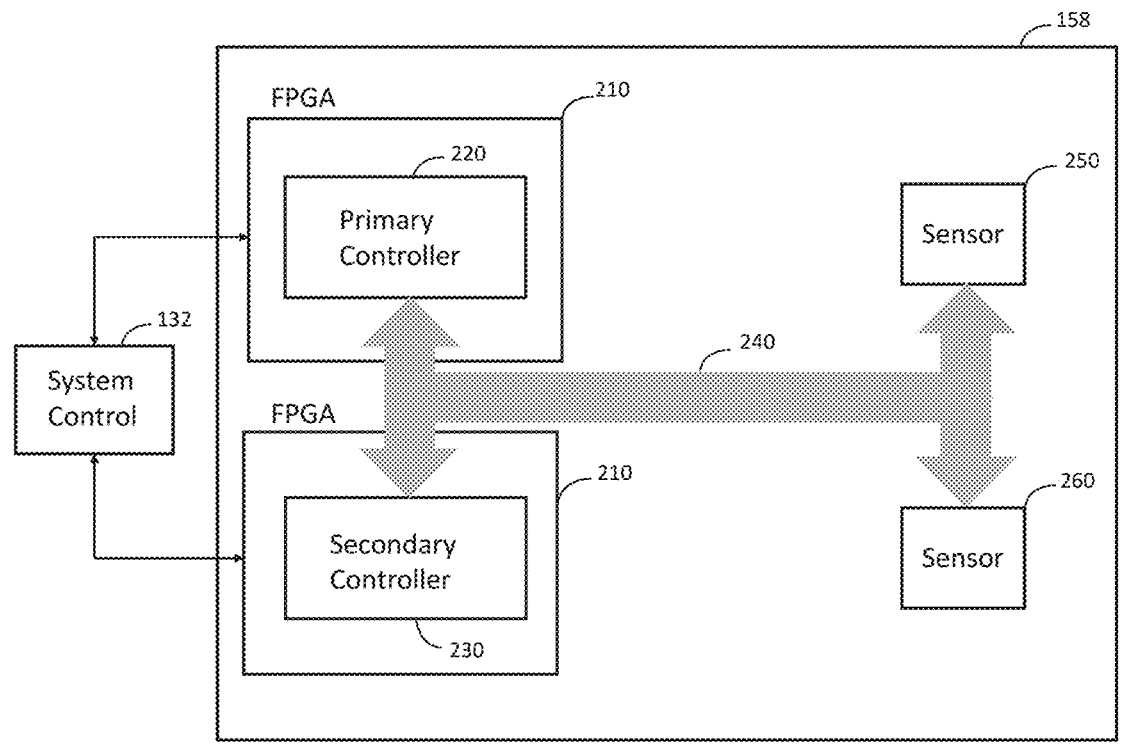
FIG. 2 depicts a field programmable gate array (FPGA) based diagnostic circuitry for a space environment according to one or more embodiments of the present invention.

FIG. 2 depicts field programmable gate array (FPGA) based circuitry for a space environment for implementing one or more embodiments of the teachings herein. An assembly 158 of a vehicle, for example the spacecraft 100, includes multiple FPGAs 210. Each FPGA 210 includes programmable circuity for providing one or more controllers 220, 230. Each controller 220, 230 is configured to control at least one internal system 120 such as, for example, the life support system within the spacecraft 100. Because of the FPGA 210, the data acquired from the internal system 120 is real-time data. In one or more embodiments, the data received by the FPGA 210 is at a rate that exceeds a data rate of the system control 132 of the spacecraft 100.

Still referring to FIG. 2, one of the controllers 220, 230 is a primary controller and the other is a secondary controller. For example, in one or more embodiments, the controller 220 is the primary controller 220 and the controller 230 is the secondary controller 230. The primary controller 220 sends a first sync pulse to the secondary controller 230 and the secondary controller 230 sends a second sync pulse to the primary controller 220. The primary and secondary controllers 220, 230 communicate with one another via the sync pulses over a channel of a multiplex of channels 240. Also, each of the controllers 220, 230 includes a dedicated sensor of a pair of sensors 250, 260. As shown in FIG. 2, the primary controller 220 communicates with a dedicated sensor 250 over a dedicated channel of the multiplex of channels 240 and the secondary controller 230 communicates with a dedicated sensor 260 over another different channel of the multiplex of channels 240.

The primary and secondary controllers 220, 230 are independent or asynchronous controllers in that they operate asynchronously relative to one another. However, in order to share one of the sensors 250, 260, the primary and secondary controllers 220, 230 synchronize use of a shared communication channel from the multiplex of channels 240 in order to share one of the sensors. In other words, although the primary controller 220 receives data from its dedicated sensor 250, at times it is also possible to receive data from the secondary controller's 230 dedicated sensor 260 and it is also possible for the secondary controller 230 to receive data from the primary controller's 220 dedicated sensor 250, so long as the primary and secondary controllers 220, 230 synchronize access to the sensor 250, 260 over the shared communication channel. Thus, each of the controllers 220, 230 are permitted to share the other controller's dedicated sensor 250, 260 so long as the particular shared sensor is not accessed at the same time by both controllers 220, 230 over the shared communication channel.

In response to receiving the second sync pulse from the secondary controller 230 at the primary controller 220, the primary controller 220 changes a period of the first sync pulse to the secondary controller 230 to indicate to the secondary controller 230 that the primary controller 220 is synced to the secondary controller 230. Also, in response to receiving the first sync pulse from the primary controller 220 at the secondary controller 230, the secondary controller 230 changes a period of the second sync pulse to the primary controller 220 to indicate to the primary controller 220 that the secondary controller 230 is synced to the primary controller 220. Changing the period of a sync pulse may include, for example, lengthening the period of the sync pulse. In such case, lengthening the period of the first sync pulse to the secondary controller 230 indicates to the secondary controller 230 that the primary controller 220 is synced to the secondary controller 230 and lengthening the period of the second sync pulse to the primary controller 220 indicates to the primary controller 220 that the secondary controller 230 is synced to the primary controller 220.

The primary controller 220 reads data from the shared sensor 260 while the secondary controller 220 waits for another sync pulse from the primary controller 220. The other sync pulse from the primary controller 220 indicates that the primary controller 220 is no longer reading data from the shared sensor 260. In other words, when the primary controller 220 is finished accessing data from the shared sensor 260, another sync pulse from the primary controller 220 is sent to the secondary controller 230 to tell the secondary controller 230 that the primary controller 220 is finished accessing the shared sensor 260. Then, in response to the secondary controller 230 receiving the other sync pulse from the primary controller 220 indicating that the primary controller 220 is no longer reading data from the shared sensor 260, the secondary controller 230 begins reading data from the shared sensor 260 and the primary controller 220 waits for another sync pulse from the secondary controller 230. The other sync pulse from the secondary controller 230 indicates the secondary controller 230 is no longer reading data from the shared sensor 260 after which the primary controller 220 can access the shared sensor 160 again. Thus, receipt of the synched pulse by either of the primary and secondary controllers 220, 230 indicates when the other of the primary and secondary controllers 220, 230 is finished utilizing the shared communication channel to a shared sensor 250, 260 and, consequently, receipt of a synched pulse by either of the primary and secondary controllers 220, 230 indicates a status of asynchronicity of the other of the primary and secondary controllers 220, 230.

Similarly, the secondary controller 230 can also share access to the data from the primary controller's 220 dedicated sensor 250. In order for the secondary controller 230 to access shared sensor 250, the secondary controller 230 must wait until the primary controller 220 send a sync pulse with a longer period indicating that the primary controller 220 is finished accessing data from the shared sensor 250. While either of the primary and secondary controllers 220, 230 is waiting to access one of the sensors 250, 260 that is dedicated to the other controller, the primary and secondary controllers 220, 230 default to their own dedicated sensor 250, 260. Thus, the secondary controller 230 reads data from its own dedicated sensor 260 while waiting to receive the other sync pulse from the primary controller 220 in order to begin reading data from the sensor 250 as the shared sensor. Also, each of the primary and secondary controllers 220, 230 defaults to its own dedicated sensor when communication between the primary and secondary controllers 220, 230 is lost or when the status of the other of the controller is unknown.

Referring to FIG. 3, an embodiment illustrating physical components of the control system 132 is shown. In a basic configuration, the control system 132 includes at least one processing unit 302 and a system memory 304. According to an aspect, depending on the configuration and type of control system 132, the system memory 304 comprises, but is not limited to, volatile storage (e.g., random access memory), non-volatile storage (e.g., read-only memory), flash memory, or any combination of such memories. According to an aspect, the system memory 304 includes an operating system 305 and one or more program modules 306 suitable for running software applications 318. According to an aspect, the system memory 304 includes one or more diagnostic modules 316 for providing diagnostic information including sensor information and data from the internal systems 120 via the FPGAs 210. Also, the system memory can includes many other modules such as, for example, a managing or monitoring module for managing and/or monitoring the sensors of the internal systems 120. The operating system 305, for example, is suitable for controlling the operation of the control system 132. In one or more embodiments, diagnostics module 316 or some other modules can initiate via the FPGAs 210 managing and or monitoring of the functioning of one or more subsystems of the interior systems 140.

Furthermore, aspects are practiced in conjunction with a graphics library, other operating systems, or any other application program, and is not limited to any particular application or system. This basic configuration is illustrated in FIG. 3 by those components within a dashed line 308. According to an aspect, the control system 132 has additional features or functionality. For example, according to an aspect, the control system 132 includes additional data storage devices (removable and/or non-removable) such as, for example, magnetic disks, optical disks, or tape. Such additional storage is illustrated in FIG. 3 by a removable storage device 319 and a non-removable storage device 320.

As stated above, according to an aspect, a number of program modules and data files are stored in the system memory 304. While executing on the processing unit 302, the program modules 306 (e.g., diagnostics module 316) perform processes including, but not limited to, one or more of the stages or steps of the method 600 illustrated in FIG. 6. According to an aspect, other program modules are also used.

According to an aspect, the control system 132 has one or more input device(s) 322 such as a keyboard, a mouse, a pen, a sound input device, a touch input device, etc. In one or more embodiments, the input device may be a recorder receiving a video feed from one or more video cameras. The output device(s) 324 such as a display, speakers, a printer, etc. are also included according to an aspect. The aforementioned devices are examples and others may be used. According to an aspect, the control system 132 includes one or more communication connections 326 allowing communications with ground control and other computing devices. Examples of suitable communication connections 326 include, but are not limited to, radio frequency (RF) transmitter, receiver, and/or transceiver circuitry; universal serial bus (USB), parallel, and/or serial ports.

Figure 4:
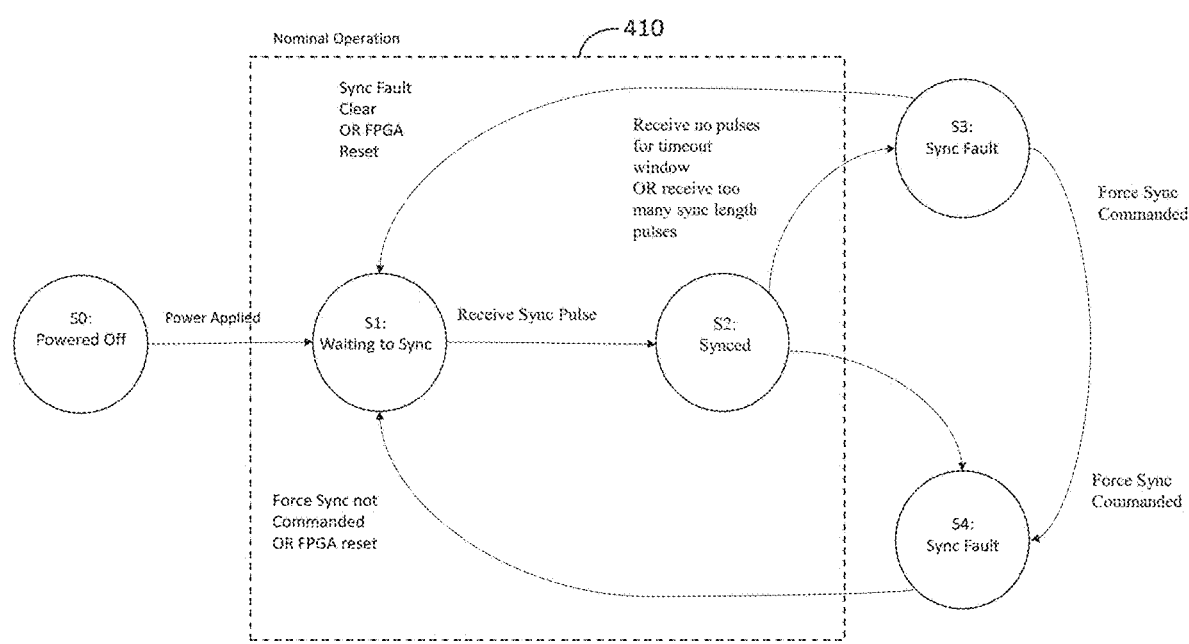
FIG. 4 depicts a state diagram illustrating the states of a controller while implementing one or more embodiments of the present invention.

FIG. 4 depicts a state diagram illustrating the states of one of the controllers 220, 230 while implementing one or more embodiments of the present invention. At state 0 the particular controller is powered off. Once power as applied to either of the controllers 220, 230, state 1 includes the controller 220, 230 waiting prior to receiving the sync pulse from the other controller in order to sync with the other controller. At state 2, as explained above, once the either of the controllers 220, 230 receives the sync pulse from the other controller, the controller 220, 230 receiving the sync pulse is synced with the other of the controllers 220,230. In FIG. 4, states 1 and 2 of a controller 220, 230 is grouped by a dashed line 410 to indicate normal operation of the controller 220, 230. On the other hand, states 3 and 4 illustrate fault states of a controller 220, 230. At state 3, in the event no sync pulse is received from the other controller 220, 230 within a predetermined timeout window or too many sync pulses are received, the controller 220, 230 faults. In such case, the sync fault may be cleared or the FPGA 210 may be reset and the controller state returned to state 2 in order to wait for another sync pulse. From state 3, the controller 220, 230 may be switched back to state 1 to wait for another sync pulse by clearing the fault or by resetting the FPGA 210. Alternatively, from either state 2 or state 3, the controller 220, 230 may be faulted in order to then command the controller 220, 230 into a new sync as shown at state 4. From state 4, the controller 220, 230 may be returned to state 1 in order to wait for another sync pulse from the other controller 220, 230.

Figure 5:
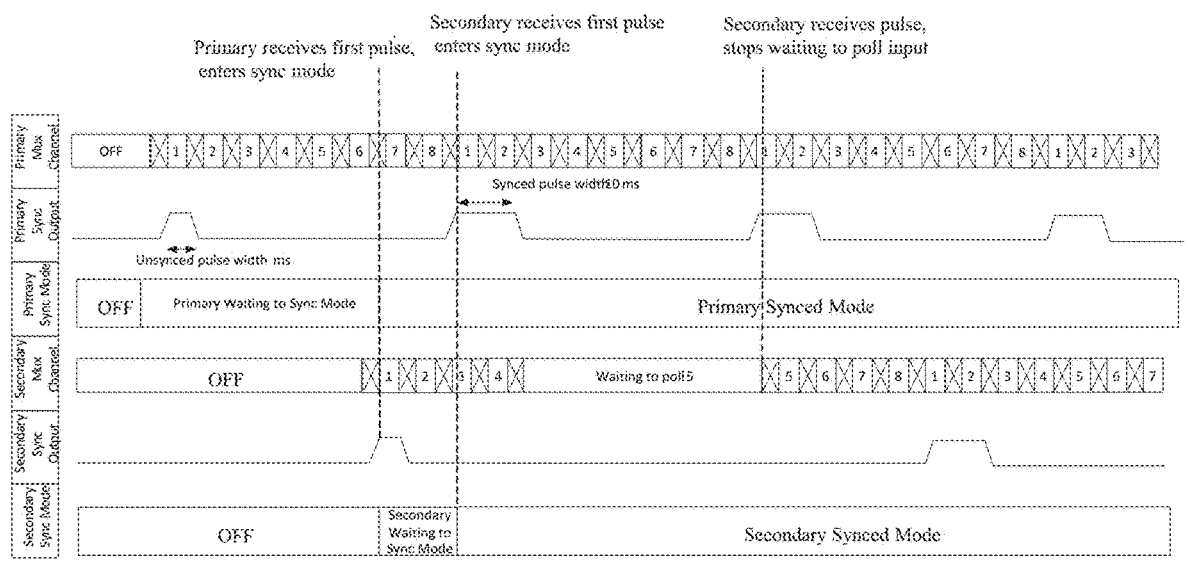
FIG. 5 depicts startup synchronization of a pair of controllers according to one or more embodiments of the present invention.

FIG. 5 depicts an example of the startup synchronization of the pair of controllers 220, 230 according to one or more embodiments of the present invention. A sync mode, sync output, and a multiplexed channel for the dedicated sensor 250 of the primary controller 220 is depicted along with a sync mode, sync output, and a multiplexed channel for the dedicated sensor 260 of the secondary controller 230. Viewing FIG. 5 from left to right, the first vertical dashed line corresponds with the edge of the first shown sync pulse of the secondary sync output from the secondary controller 230 where the primary controller 220 receives the first sync pulse from the secondary controller 230 and enters the sync mode. Then, while the second controller 230 is waiting, as shown at the second vertical dashed line, the primary controller 220 outputs its sync pulse to the secondary controller 230. The output sync pulse from the primary controller 220 includes a lengthened period for indicating that the primary controller 220 is synced as described above. The secondary controller 230 then enters its own sync mode. At the third vertical dashed line, the secondary controller 230 receives another sync pulse as output from the primary controller 220 and the secondary controller 230 stops waiting to poll input.

Figure 6:
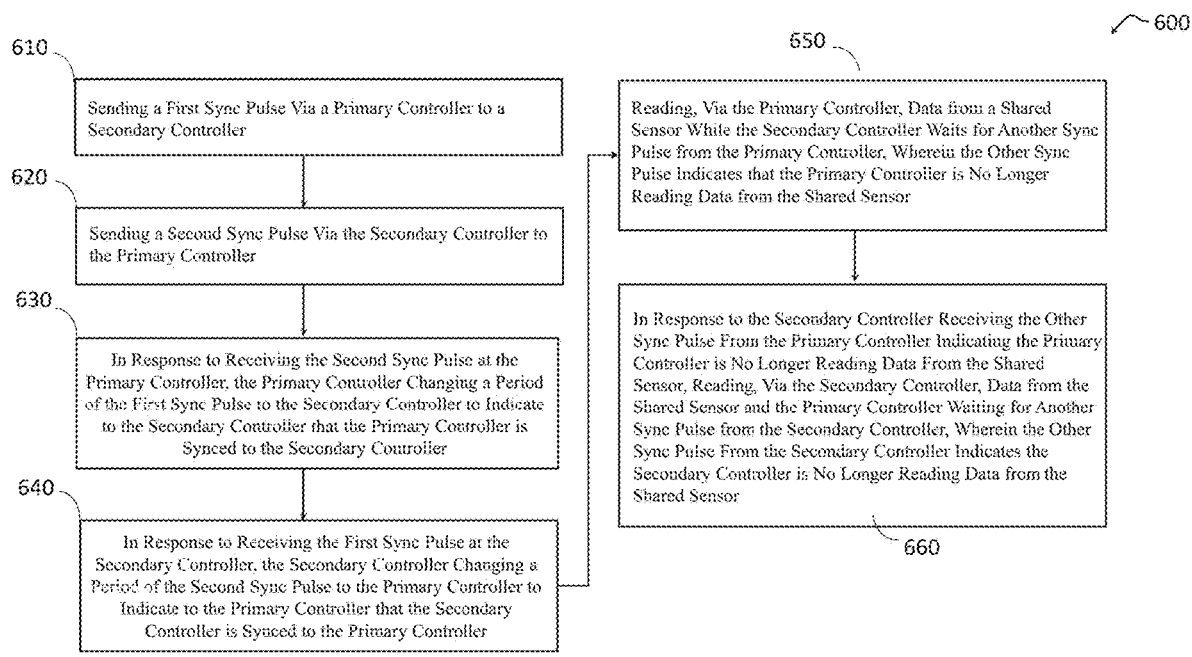
FIG. 6 is a flow diagram illustrating a method for providing collision avoidance protection to controllers sharing the same sensor according to one or more embodiments of the present invention.

Turning to FIG. 6, one or more embodiments may include a method 600 for providing collision avoidance protection to controllers sharing the same sensor. The flow diagram of FIG. 6 illustrates the method 600 that includes process block 610 for sending a first sync pulse via a primary controller to a secondary controller and process block 620 for sending a second sync pulse via the secondary controller to the primary controller. The method 600 also includes process block 630 for, in response to receiving the second sync pulse at the primary controller, the primary controller changing a period of the first sync pulse to the secondary controller to indicate to the secondary controller that the primary controller is synced to the secondary controller. The method 600 also includes process block 640 for, in response to receiving the first sync pulse at the secondary controller, the secondary controller changing a period of the second sync pulse to the primary controller to indicate to the primary controller that the secondary controller is synced to the primary controller. Also, the method 600 includes process block 650 for reading, via the primary controller, data from a shared sensor while the secondary controller waits for another sync pulse from the primary controller, wherein the other sync pulse indicates that the primary controller is no longer reading data from the shared sensor. The method 600 also includes process block 660 for, in response to the secondary controller receiving the other sync pulse from the primary controller indicating the primary controller is no longer reading data from the shared sensor, reading, via the secondary controller, data from the shared sensor and the primary controller waiting for another sync pulse from the secondary controller, wherein the other sync pulse from the secondary controller indicates the secondary controller is no longer reading data from the shared sensor.

The method 600 may also include one or more other process blocks. In one or more embodiments, the method 600 may include where the shared sensor is one of a pair of sensors shared between the primary and secondary controllers and one of the sensors of the pair of sensors is dedicated to the primary controller and the other sensor of the pair of sensors is dedicated to the secondary controller. The method 600 may also include where either of the primary and secondary controllers defaults to its own dedicated sensor when a status of the other of the primary and secondary controllers is unknown. Also, the method 600 may include each of the primary and secondary controllers defaulting to a dedicated sensor when communication between the primary and secondary controllers is lost.

The method 600 may also include changing a period of the first sync pulse to the secondary controller to indicate to the secondary controller that the primary controller is synced to the secondary controller comprises lengthening the period of the first sync pulse to the secondary controller to indicate to the secondary controller that the primary controller is synced to the secondary controller and wherein changing the period of the second sync pulse to the primary controller to indicate to the primary controller that the secondary controller is synced to the primary controller comprises lengthening the period of the second sync pulse to the primary controller to indicate to the primary controller that the secondary controller is synced to the primary controller. Also, the method 600 may include the primary and secondary controllers sharing a communication channel to the shared sensor and wherein receipt of the sync pulses indicate when each of the primary and secondary controllers is done reading data from the shared sensor over the shared communication channel. The method 600 can include the second controller reading data from a dedicated sensor while waiting to receive the other sync pulse from the primary controller in order to begin reading data from the shared sensor and the primary controller reading data from a dedicated sensor while waiting to receive the other sync pulse from the secondary controller in order to begin reading data from the shared sensor.

The method 600 can include where the primary and secondary controllers are independent controllers that operate asynchronously relative to one another, and wherein the primary and secondary controllers synchronize use of a shared communication channel to the shared sensor. The method 600 may also include where receipt of the synched pulse by either of the primary and secondary controllers indicates when the other of the primary and secondary controllers is finished utilizing a shared channel to the shared sensor. Also, the method 600 may include where receipt of the synched pulse by either of the primary and secondary controllers indicates a status of asynchronicity of the other of the primary and secondary controllers. The method 600 can include the primary and secondary controllers waiting prior to receiving the second and first sync pulses, respectively, in order to begin reading data from the shared sensor across a shared communication channel and the primary and secondary controllers reading data from respective dedicated sensors while waiting for the first and second sync pulses.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing collision avoidance protection to controllers sharing the same sensor, the method comprising:

sending a first sync pulse via a primary controller to a secondary controller;

sending a second sync pulse via the secondary controller to the primary controller;

in response to receiving the second sync pulse at the primary controller, the primary controller changing a period of the first sync pulse to the secondary controller to indicate to the secondary controller that the primary controller is synced to the secondary controller;

in response to receiving the first sync pulse at the secondary controller, the secondary controller changing a period of the second sync pulse to the primary controller to indicate to the primary controller that the secondary controller is synced to the primary controller;

reading, via the primary controller, data from a shared sensor while the secondary controller waits for another sync pulse from the primary controller, wherein the other sync pulse indicates that the primary controller is no longer reading data from the shared sensor; and in response to the secondary controller receiving the other sync pulse from the primary controller indicating the primary controller is no longer reading data from the shared sensor, reading, via the secondary controller, data from the shared sensor and the primary controller waiting for another sync pulse from the secondary controller, wherein the other sync pulse from the secondary controller indicates the secondary controller is no longer reading data from the shared sensor;

wherein each of the primary and secondary controllers defaults to a dedicated sensor when communication between the primary and secondary controllers is lost.

2. The method of claim 1 wherein the shared sensor is one of a pair of sensors shared between the primary and secondary controllers and one of the sensors of the pair of sensors is dedicated to the primary controller and the other sensor of the pair of sensors is dedicated to the secondary controller.

3. The method of claim 1 wherein changing a period of the first sync pulse to the secondary controller to indicate to the secondary controller that the primary controller is synced to the secondary controller comprises lengthening the period of the first sync pulse to the secondary controller to indicate to the secondary controller that the primary controller is synced to the secondary controller and wherein changing the period of the second sync pulse to the primary controller to indicate to the primary controller that the secondary controller is synced to the primary controller comprises lengthening the period of the second sync pulse to the primary controller to indicate to the primary controller that the secondary controller is synced to the primary controller.

4. The method of claim 1 further comprising the primary and secondary controllers sharing a communication channel to the shared sensor and wherein receipt of the sync pulses indicate when each of the primary and secondary controllers is done reading data from the shared sensor over the shared communication channel.

5. The method of claim 1 further comprising the second controller reading data from a dedicated sensor while waiting to receive the other sync pulse from the primary controller in order to begin reading data from the shared sensor.

6. The method of claim 1 further comprising the primary controller reading data from a dedicated sensor while waiting to receive the other sync pulse from the secondary controller in order to begin reading data from the shared sensor.

7. The method of claim 1 wherein the primary and secondary controllers are independent controllers that operate asynchronously relative to one another, and wherein the primary and secondary controllers synchronize use of a shared communication channel to the shared sensor.

8. The method of claim 1 wherein receipt of the synched pulse by either of the primary and secondary controllers indicates when the other of the primary and secondary controllers is finished utilizing a shared communication channel to the shared sensor.

9. The method of claim 1 wherein receipt of the synched pulse by either of the primary and secondary controllers indicates a status of asynchronicity of the other of the primary and secondary controllers.

10. The method of claim 1 further comprising the primary and secondary controllers waiting prior to receiving the second and first sync pulses, respectively, in order to begin reading data from the shared sensor across a shared communication channel and the primary and secondary controllers reading data from respective dedicated sensors while waiting for the first and second sync pulses.

11. A method for providing collision avoidance protection to controllers sharing the same sensor, the method comprising:

sending a first sync pulse via a primary controller to a secondary controller;

sending a second sync pulse via the secondary controller to the primary controller;

in response to receiving the second sync pulse at the primary controller, the primary controller changing a period of the first sync pulse to the secondary controller to indicate to the secondary controller that the primary controller is synced to the secondary controller;

in response to receiving the first sync pulse at the secondary controller, the secondary controller changing a period of the second sync pulse to the primary controller to indicate to the primary controller that the secondary controller is synced to the primary controller;

reading, via the primary controller, data from a shared sensor while the secondary controller waits for another sync pulse from the primary controller, wherein the other sync pulse indicates that the primary controller is no longer reading data from the shared sensor; and in response to the secondary controller receiving the other sync pulse from the primary controller indicating the primary controller is no longer reading data from the shared sensor, reading, via the secondary controller, data from the shared sensor and the primary controller waiting for another sync pulse from the secondary controller, wherein the other sync pulse from the secondary controller indicates the secondary controller is no longer reading data from the shared sensor;

wherein the shared sensor is one of a pair of sensors shared between the primary and secondary controllers and one of the sensors of the pair of sensors is dedicated to the primary controller and the other sensor of the pair of sensors is dedicated to the secondary controller;

wherein either of the primary and secondary controllers defaults to its own dedicated sensor when a status of the other of the primary and secondary controllers is unknown.

12. A system for providing collision avoidance protection to controllers sharing the same sensor, the system comprising:

a first field programmable gate array (FPGA) comprising a primary controller;

a second FPGA comprising a secondary controller, wherein the primary and secondary controllers are asynchronous relative to one another, and wherein the primary and secondary controllers synchronize communications for receiving sensor data; and a pair of shared sensors, wherein each of the sensors of the pair of sensors is shared between the primary and secondary controllers, one of the sensors of the pair of sensors is dedicated to the primary controller, and the other sensor of the pair of sensors is dedicated to the secondary controller, wherein in response to receiving a first sync pulse from the primary controller at the secondary controller, the secondary controller changes a period of a second sync pulse sent to the primary controller to indicate to the primary controller that the secondary controller is synced to the primary controller, and in response to receiving the second sync pulse from the secondary controller at the primary controller, the primary controller changes a period of the first sync pulse to the secondary controller to indicate to the secondary controller that the primary controller is synced to the secondary controller;

wherein each of the primary and secondary controllers default to reading data from its own dedicated sensor while waiting for the other of the primary and secondary controllers to finish reading data from its own dedicated sensor.

13. The system of claim 12 wherein the primary controller reads data from sensor dedicated to the secondary controller while the secondary controller waits for another sync pulse from the primary controller, wherein the other sync pulse indicates that the primary controller is no longer reading data from the sensor dedicated to the secondary controller.

14. The system of claim 13 wherein, in response to the secondary controller receiving the other sync pulse from the primary controller indicating the primary controller is no longer reading data from the shared sensor, the secondary controller reads data from its dedicated sensor while the primary controller waits for another sync pulse from the secondary controller to indicate when the secondary controller is no longer reading data from its dedicated sensor.

15. The system of claim 12 wherein each of the primary and secondary controllers default to reading data from its own dedicated sensor when a status of the other of the primary and secondary controllers is unknown.

16. The system of claim 12 further comprising a shared communication channel for communicating with the pair of shared sensors, wherein the primary and secondary controllers synchronize use of the shared communication channel.

17. The system of claim 12 wherein the system is an internal system of a spacecraft.

* * * * *